US008941671B2

(12) United States Patent
Malakapalli et al.

(10) Patent No.: US 8,941,671 B2
(45) Date of Patent: Jan. 27, 2015

(54) PARA-VIRTUALIZED DOMAIN, HULL, AND GEOMETRY SHADERS

(75) Inventors: Meher Prasad Malakapalli, Santa Clara, CA (US); Hao Zhang, Sunnyvale, CA (US); Lin Tan, Cupertino, CA (US); Meetesh Barua, Sunnyvale, CA (US); Pandele Stanescu, Santa Clara, CA (US); B. Anil Kumar, Saratoga, CA (US); Eric K. Han, Sunnyvale, CA (US); Artem Belkine, Renton, WA (US); Jeroen Dirk Meijer, Sunnyvale, CA (US); Winston Matthew Penfold Johnston, San Mateo, CA (US)

(73) Assignee: Microsoft Corporation, Redmond, WA (US)

( * ) Notice: Subject to any disclaimer, the term of this patent is extended or adjusted under 35 U.S.C. 154(b) by 373 days.

(21) Appl. No.: 13/350,246

(22) Filed: Jan. 13, 2012

(65) Prior Publication Data
US 2013/0181999 A1 Jul. 18, 2013

(51) Int. Cl.
*G06T 1/20* (2006.01)
*G06F 15/16* (2006.01)

(52) U.S. Cl.
USPC ............................. 345/506; 345/501; 345/502

(58) Field of Classification Search
CPC ..... G06T 1/20; G06T 15/005; G06T 2210/52; G06T 1/60
USPC ........................................................ 345/505
See application file for complete search history.

(56) References Cited

U.S. PATENT DOCUMENTS

| 7,394,464 | B2 | 7/2008 | Peeper et al. |
| 8,661,355 | B1 | 2/2014 | Liu et al. |
| 2005/0231503 | A1 | 10/2005 | Heng et al. |
| 2006/0146057 | A1 | 7/2006 | Blythe |
| 2006/0161572 | A1 | 7/2006 | Vogt et al. |
| 2008/0074430 | A1 | 3/2008 | Jiao et al. |
| 2008/0168479 | A1 | 7/2008 | Purtell et al. |
| 2008/0204473 | A1 | 8/2008 | Jackson |
| 2008/0303833 | A1* | 12/2008 | Swift et al. ..................... 345/505 |

(Continued)

OTHER PUBLICATIONS

Dowty, et al., "GPU Virtualization on VMware's Hosted I/O Architecture", In Proceedings of ACM SIGOPS Operating Systems Review, vol. 43, Issue 3, Jul. 2009, pp. 73-82.

(Continued)

*Primary Examiner* — David Zarka
*Assistant Examiner* — Tapas Mazumder
(74) *Attorney, Agent, or Firm* — Jim Sfekas; Peter Taylor; Micky Minhas

(57) ABSTRACT

The present invention extends to methods, systems, and computer program products for providing domain, hull, and geometry shaders in a para-virtualized environment. As such, a guest application executing in a child partition is enabled use a programmable GPU pipeline of a physical GPU. A vGPU (executing in the child partition) is presented to the guest application. The vGPU exposes DDIs of a rendering framework. The DDIs enable the guest application to send graphics commands to the vGPU, including commands for utilizing a domain shader, a hull shader, and/or a geometric shader at a physical GPU. A render component (executing within the root partition) receives physical GPU-specific commands from the vGPU, including commands for using the domain shader, the hull shader, and/or the geometric shader. The render component schedules the physical GPU-specific command(s) for execution at the physical GPU.

20 Claims, 2 Drawing Sheets

(56) References Cited

U.S. PATENT DOCUMENTS

| | | | |
|---|---|---|---|
| 2009/0322764 | A1 | 12/2009 | Saini et al. |
| 2010/0214301 | A1 | 8/2010 | Li et al. |
| 2010/0328334 | A1 | 12/2010 | Chen et al. |
| 2011/0063296 | A1 | 3/2011 | Bolz et al. |
| 2011/0080404 | A1* | 4/2011 | Rhoades et al. .............. 345/423 |
| 2011/0102443 | A1* | 5/2011 | Dror et al. ..................... 345/522 |
| 2011/0179261 | A1 | 7/2011 | Tachibana |
| 2011/0242119 | A1 | 10/2011 | Bolz et al. |
| 2013/0155080 | A1 | 6/2013 | Nordlund |

OTHER PUBLICATIONS

Domonkos, et al., "A Programming Model for GPU-based Parallel Computing with Scalability and Abstraction", In Proceedings of Spring Conference on Computer Graphics, 2009, pp. 103-111.

Buck, et al., "Brook for GPUs: Stream Computing on Graphics Hardware", In Proceedings of ACM Transactions on Graphics, vol. 23, Issue 3, Aug. 2004, pp. 777-786.

Rumpf, et al., "Graphics Processor Units: New Prospects for Parallel Computing", In Proceedings of Numerical Solution of Partial Differential Equations on Parallel Computers, Lecture Notes in Computational Science and Engineering, vol. 51, 2005, pp. 89-134.

Nickolls, et al., "Graphics and Computing GPUs", Published on: Sep. 8, 2010, Available at: http://sjlee.sch.ac.kr/lecture/arch/2010/%B0%AD%C0%C7%BA%B8%C1%B6%C0%DA%B7%E1(4e)/Chapters_Appendix/Appendix/Appendix-A-P374493.pdf.

"Difference between effects 10 and effects 11", Retrieved on: Nov. 11, 2011, Available at: http://msdn.microsoft.com/en-us/library/windows/desktop/ff476141(v=vs.85).aspx.

"Direct3D Functions Called by User-Mode Display Drivers", Retrieved on: Nov. 11, 2011, Available at: http://msdn.microsoft.com/en-us/library/ff552862(v=VS.85).aspx.

"SUSE Linux Enterprise Virtual Machine Driver Pack", Retrieved on: Nov. 11, 2011, Available at: http://www.suse.com/products/vmdriverpack/features/performance.html.

Gupta, et al., "GViM: GPU-accelerated Virtual Machines", In Proceedings of the 3rd ACM Workshop on System-level Virtualization for High Performance Computing, Mar. 31, 2009, pp. 8.

D3DKMDT_GDISURFACETYPE enumeration, Retrieved on Jan. 17, 2012, Available at: http://msdn.microsoft.com/en-us/library/ff546039(v=vs.85).aspx.

D3D11DDI_DEVICEFUNCS structure, Retrieved on Jan. 17, 2012, Available at: http://msdn.microsoft.com/en-us/library/ff542141(v=vs.85).aspx.

DxgkDdiRenderKm routine, Retrieved on Jan. 17, 2012, Available at: http://msdn.microsoft.com/en-us/library/ff559800(v=vs.85).aspx.

U.S. Appl. No. 13/352,121, Mar. 20, 2014, Office Action.

Notice of Allowance dated Sep. 17, 2014 cited in U.S. Appl. No. 13/352,121.

* cited by examiner

PARA-VIRTUALIZED DOMAIN, HULL, AND GEOMETRY SHADERS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

Some computer systems are configured to provide para-virtualized execution environments, which allow guest software to share hardware devices of a single computer system in an isolated manner. Generally, para-virtualized execution environments provide a plurality of partitions, supported by a hypervisor. Each partition comprises an isolated execution environment for software executing therein. The partitions generally include a root partition and one or more child partitions. The root partition runs a host operating system and manages a virtualization stack. The root partition may gain access to physical devices. Each child partition hosts guest software (e.g., guest operating systems and guest applications). Child partitions are provided access to physical devices through virtual devices and software interfaces of the hypervisor.

Some para-virtualized execution environments provide child partitions (and guest software executing therein) with para-virtualized access to one or more physical graphics processing units ("GPUs"). Each implementation of para-virtualized access to physical GPUs typically supports a single rendering framework. As such, guest software may be unable to access one or more GPU functions of a physical GPU if that guest software is executing within a para-virtualized execution environment that does not support those GPU functions. For example, if the para-virtualized execution environment supports a legacy version of a rendering framework, then guest software executing within the para-virtualized execution environment cannot leverage GPU functions implemented by newer versions of the rendering framework. This is true even though those functions are supported by the physical GPU.

Thus guest software may need to perform a GPU function not supported by the para-virtualized environment in which it is running. When this occurs, the guest software may rely on using a fully virtualized processing unit, may use a translation layer to perform the GPU function, and/or may use an inferior GPU function that is supported by the para-virtualized environment. Any of these solutions can incur potentially significant performance penalties for the guest software. In some cases, the guest software may be unable to perform the GPU function at all, leading to errors and/or decreased functionality of the guest software.

BRIEF SUMMARY

The present invention extends to methods, systems, and computer program products for providing domain, hull, and geometry shaders in a para-virtualized environment. As such, embodiments of the invention provide a rich programmable GPU pipeline to guest applications.

Embodiments include a method for providing a programmable GPU pipeline to a guest application executing in a child partition of a para-virtualized execution environment. A virtual machine session is instantiated. The virtual machine session includes a hypervisor that provides (i) a root partition (which has access to a physical GPU), and (ii) a child partition (which executes a guest application).

A virtualized graphics processing unit ("vGPU"), which also executes within the child partition, is presented to the guest application. The vGPU presents device driver interfaces ("DDIs") of a rendering framework to the guest application as part of a user-mode driver ("UMD"). The DDIs provide an API that enables the guest application to send commands to the vGPU. The API enables the guest application to program a GPU pipeline of the physical GPU to utilize one or more features of the rendering framework, including utilizing a domain shader, a hull shader, and/or a geometric shader.

A render component, which executes within the root partition, receives one or more physical GPU-specific commands from the vGPU. The physical GPU-specific commands are for using the domain shader, the hull shader, or the geometric shader at the physical GPU. The render component schedules the physical GPU-specific command(s) for execution at the physical GPU.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
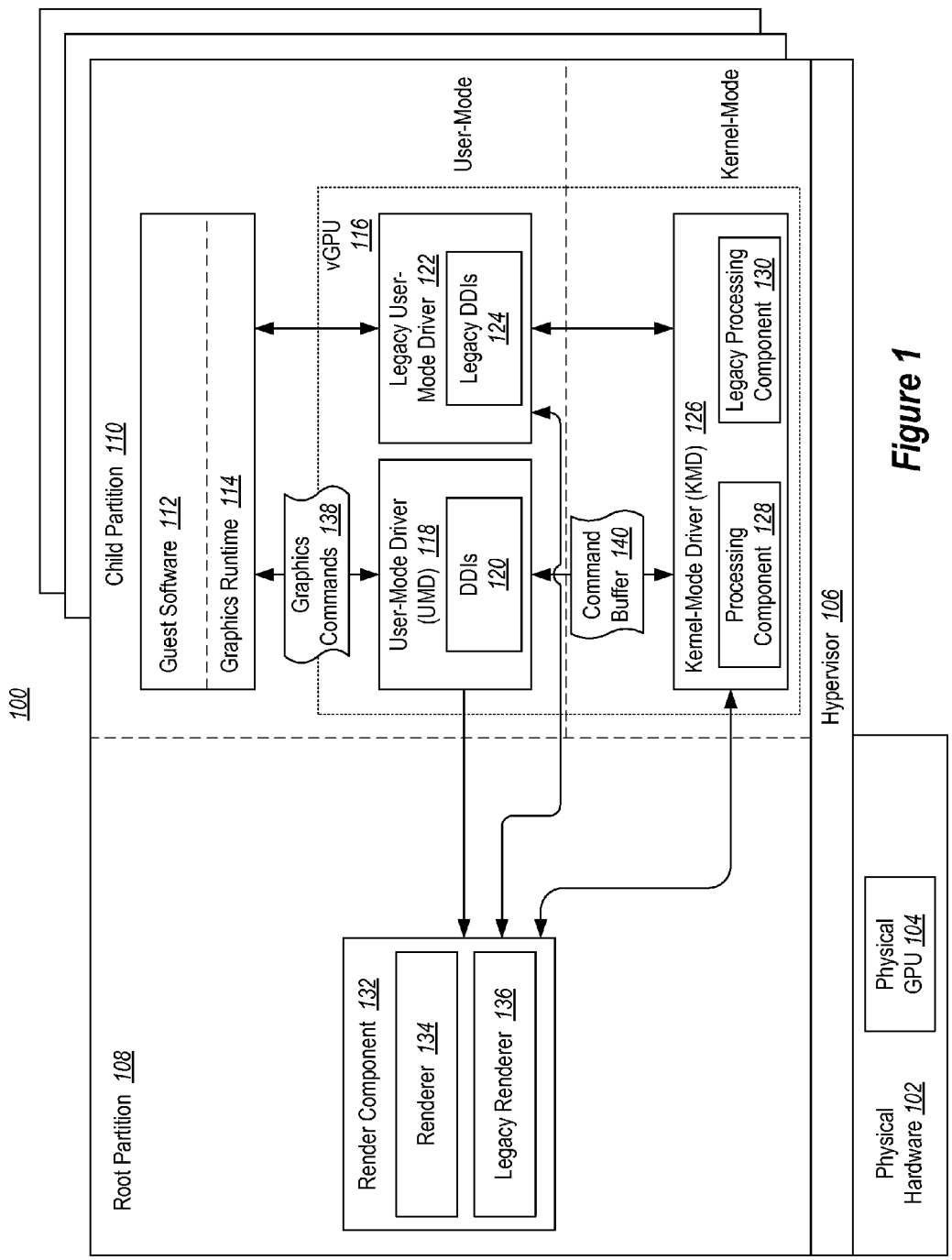
FIG. 1 illustrates an example computer architecture that facilitates providing a programmable graphics processing unit ("GPU") pipeline to a guest application executing in a child partition of a para-virtualized execution environment.

The present invention extends to methods, systems, and computer program products for providing domain, hull, and geometry shaders in a para-virtualized environment. As such, embodiments of the invention provide a rich programmable GPU pipeline to guest applications.

Embodiments include a method for providing a programmable GPU pipeline to a guest application executing in a child partition of a para-virtualized execution environment. A virtual machine session is instantiated. The virtual machine session includes a hypervisor that provides (i) a root partition (which has access to a physical GPU), and (ii) a child partition (which executes a guest application).

A virtualized graphics processing unit ("vGPU"), which also executes within the child partition, is presented to the guest application. The vGPU presents device driver interfaces ("DDIs") of a rendering framework to the guest application as part of a user-mode driver ("UMD"). The DDIs provide an API that enables the guest application to send commands to the vGPU. The API enables the guest application to program a GPU pipeline of the physical GPU to utilize one or more features of the rendering framework, including utilizing a domain shader, a hull shader, and/or a geometry shader.

A render component, which executes within the root partition, receives one or more physical GPU-specific commands from the vGPU. The physical GPU-specific commands are for using the domain shader, the hull shader, or the geometry shader at the physical GPU. The render component schedules the physical GPU-specific command(s) for execution at the physical GPU.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates providing a programmable GPU pipeline to a guest application executing in a child partition of a para-virtualized execution environment. Referring to FIG. 1, computer architecture 100 includes physical hardware 102. Physical hardware 102 can include any appropriate hardware devices, such as one or more general purpose processors, system memory, and the like. As depicted, physical hardware 102 includes physical GPU 104, and may include a plurality of physical GPUs.

Physical GPU 104 is a processing device configured to perform parallel processing tasks, such as graphics rendering tasks. Physical GPU 104 supports a variety of GPU functions.

Some supported GPU functions are fixed functions, and some supported GPU functions are programmable functions. Programmable functions provide for a programmable rendering pipeline (as opposed to a merely fixed rendering pipeline). A programmable rendering pipeline enables the output of one GPU function to become the input of another GPU function. In particular, physical GPU 104 supports both legacy programmable functions (i.e., functions supported by legacy rendering frameworks) and newer programmable functions (i.e., functions supported by newer rendering frameworks). Legacy programmable functions may include vertex shaders and pixel shaders. Newer programmable functions may include domain shaders, hull shaders, and geometric shaders.

Computer architecture 100 also includes hypervisor 106. Hypervisor 106 executes on top of physical hardware 102 and supports a virtualization platform. The virtualization platform provides a plurality of partitions. Each partition provides a logical unit of isolation, in which guest software executes. As depicted, computer architecture 100 includes root partition 108 and child partition 110.

Root partition 108 executes a host operating system, and has direct access to physical hardware 102 (as depicted by root partition 108 appearing over physical hardware 102). Each child partition provides an execution environment for executing guest software (e.g., operating systems and/or applications) and may access physical hardware 102 indirectly in a para-virtualized manner. That is, each child partition provides one or more software interfaces (e.g., virtualized hardware) to guest software. The guest software, in turn, uses the software interface(s) to access physical hardware 102. Computer architecture 100 can include a plurality of child partitions.

As depicted, guest software 112 executes within child partition 110. Guest software 112 comprises an operating system, and/or an application program executing within an operating system. Guest software 112 includes or uses graphics runtime 114. Guest software 112 may be an operating system that includes graphics runtime 114, or may be an application executing within the operating system that uses graphics runtime 114 provided by the operating system. Graphics runtime 114 corresponds to one or more graphics rendering frameworks, and provides APIs which enable guest software 112 to request execution of GPU functions of the supported rendering framework(s) (e.g., various shaders).

Child partition 110 provides guest software 112 access to vGPU 116. vGPU 116 virtualizes physical GPU 104, enabling guest software 112 to indirectly access physical GPU 104. As such, vGPU 116 is configured to expose all, or a subset, of the functionality of rendering frameworks supported by graphics runtime 114 to guest software 112, along with any corresponding functionality of physical GPU 104.

In particular, vGPU 116 is configured to expose one or more software interfaces to guest software 112 that enable guest software 112 to call vGPU 116 for accessing GPU functions of physical GPU 101a. vGPU 106, in turn, works in conjunction with render component 132 in root partition 108 to execute any requested GPU functions on physical GPU 104.

As depicted, vGPU 116 includes user-mode driver 118 and legacy user-mode driver 112 executing in a user-mode of child partition 110. Each user-mode driver exposes one or more device driver interfaces ("DDIs") that enable guest software 112 to indirectly request execution of GPU functions at physical GPU 104 through calls to vGPU 116. Legacy user-mode driver 122 exposes legacy DDIs 124 corresponding to GPU functionality that is supported by a legacy rendering framework. For example, legacy DDIs 124 may include DDIs related to fixed GPU functions, or DDIs related to some programmable GPU functions supported by legacy rendering frameworks, such as vertex shaders and/or pixel shaders. As such, legacy user mode driver 122 of vGPU 116 enables graphics runtime 114 to make use of a legacy rendering framework.

User-mode driver 118, on the other hand, exposes DDIs 120 corresponding to GPU functionality that is supported by one or more newer rendering frameworks, and that was not supported by the legacy rendering framework. For example, DDIs 120 may include DDIs related to additional programmable GPU functions, such as domain shaders, hull shaders, and/or geometric shaders. In some embodiments, DDI's 120 expose all DDIs supported by one or more newer rendering frameworks.

In some embodiments, each user-mode driver exposes DDIs from the DirectX® rendering framework from Microsoft® Corporation. For example, legacy user-mode driver 122 may support the version 9 series of DirectX® (e.g., version 9.0c). As such, legacy DDIs 124 may include DDIs from the version 9 series of Direct3D (e.g., DDIs relating to fixed GPU functions and some programmable GPU functions supported by Direct3D version 9, such as vertex shaders and/or pixel shaders). Continuing the DirectX® example, user-mode driver 118 may support one or more newer versions of DirectX®, such as the version 10 and/or the version 11 series of DirectX®. As such, DDIs 120 can include DDIs from one or more of versions 10 and/or 11 of Direct3D (e.g., DDIs relating to domain, hull, and/or geometric shaders). In addition, DDIs 120 may also include Direct2D DDIs. In some embodiments, DDIs 120 include all DirectX® version 10 and 11 DDIs, such that graphics runtime 114 can utilize the full range of DirectX® version 10 and 11 functionality.

In some embodiments, DDIs 120 include the following DDIs related to Direct3D versions 10, 10.1 and 11:

Direct3D10

PFND3D10DDI_CALCPRIVATEDEPTHSTENCIL-STATESIZE
pfnCalcPrivateDepthStencilStateSize;
PFND3D10DDI_CALCPRIVATEELEMENTLAYOUT-SIZE
pfnCalcPrivateElementLayoutSize;
PFND3D10DDI_CALCPRIVATEOPENEDRESOURCE-SIZE
pfnCalcPrivateOpenedResourceSize;
PFND3D10DDI_CALCPRIVATEQUERYSIZE
pfnCalcPrivateQuerySize;
PFND3D10DDI_CALCPRIVATERASTERIZERSTATE-SIZE
pfnCalcPrivateRasterizerStateSize;
PFND3D10DDI_CALCPRIVATERENDERTARGET-VIEWSIZE
pfnCalcPrivateRenderTargetViewSize;
PFND3D10DDI_CALCPRIVATESAMPLERSIZE
pfnCalcPrivateSamplerSize;
PFND3D10DDI_CALCPRIVATESHADERSIZE
pfnCalcPrivateShaderSize;
PFND3D10DDI_CHECKCOUNTER
pfnCheckCounter;
PFND3D10DDI_CHECKCOUNTERINFO
pfnCheckCounterinfo;
PFND3D10DDI_CHECKFORMATSUPPORT
pfnCheckFormatSupport;

PFND3D10DDI_CHECKMULTISAMPLEQUALITY-
LEVELS
   pfnCheckMultisampleQualityLevels;
PFND3D10DDI_CLEARDEPTHSTENCILVIEW
   pfnClearDepthStencilView;
PFND3D10DDI_CLEARRENDERTARGETVIEW
   pfnClearRenderTargetView;
PFND3D10DDI_CREATEDEPTHSTENCILSTATE
   pfnCreateDepthStencilState;
PFND3D10DDI_CREATEELEMENTLAYOUT
   pfnCreateElementLayout;
PFND3D10DDI_CREATEGEOMETRYSHADER
   pfnCreateGeometryShader;
PFND3D10DDI_CREATEPIXELSHADER
   pfnCreatePixelShader;
PFND3D10DDI_CREATEQUERY
   pfnCreateQuery;
PFND3D10DDI_CREATERASTERIZERSTATE
   pfnCreateRasterizerState;
PFND3D10DDI_CREATERENDERTARGETVIEW
   pfnCreateRenderTargetView;
PFND3D10DDI_CREATESAMPLER
   pfnCreateSampler;
PFND3D10DDI_CREATEVERTEXSHADER
   pfnCreateVertexShader;
PFND3D10DDI_DESTROYBLENDSTATE
   pfnDestroyBlendState;
PFND3D10DDI_DESTROYDEPTHSTENCILSTATE
   pfnDestroyDepthStencilState;
PFND3D10DDI_DESTROYDEPTHSTENCILVIEW
   pfnDestroyDepthStencilView;
PFND3D10DDI_DESTROYDEVICE
   pfnDestroyDevice;
PFND3D10DDI_DESTROYELEMENTLAYOUT
   pfnDestroyElementLayout;
PFND3D10DDI_DESTROYQUERY
   pfnDestroyQuery;
PFND3D10DDI_DESTROYRASTERIZERSTATE
   pfnDestroyRasterizerState;
PFND3D10DDI_DESTROYRENDERTARGETVIEW
   pfnDestroyRenderTargetView;
PFND3D10DDI_DESTROYRESOURCE
   pfnDestroyResource;
PFND3D10DDI_DESTROYSAMPLER
   pfnDestroySampler;
PFND3D10DDI_DESTROYSHADER
   pfnDestroyShader;
PFND3D10DDI_DESTROYSHADERRESOURCE-
VIEW
   pfnDestroyShaderResourceView;
PFND3D10DDI_DRAW
   pfnDraw;
PFND3D10DDI_DRAWAUTO
   pfnDrawAuto;
PFND3D10DDI_DRAWINDEXED
   pfnDrawIndexed;
PFND3D10DDI_DRAWINDEXEDINSTANCED
   pfnDrawIndexedInstanced;
PFND3D10DDI_DRAWINSTANCED
   pfnDrawInstanced;
PFND3D10DDI_FLUSH
   pfnFlush;
PFND3D10DDI_GENMIPS
   pfnGenMips;
PFND3D10DDI_IA_SETINDEXBUFFER
   pfnIaSetIndexBuffer;
PFND3D10DDI_IA_SETTOPOLOGY
   pfnIaSetTopology;
PFND3D10DDI_IA_SETVERTEXBUFFERS
   pfnIaSetVertexBuffers;
PFND3D10DDI_OPENRESOURCE
   pfnOpenResource;
PFND3D10DDI_QUERYBEGIN
   pfnQueryBegin;
PFND3D10DDI_QUERYEND
   pfnQueryEnd;
PFND3D10DDI_QUERYGETDATA
   pfnQueryGetData;
PFND3D10DDI_RESETPRIMITIVEID
   pfnResetPrimitiveID;
PFND3D10DDI_RESOURCECOPY
   pfnResourceCopy;
PFND3D10DDI_RESOURCECOPY
   pfnResourceConvert;
PFND3D10DDI_RESOURCECOPYREGION
   pfnResourceCopyRegion;
PFND3D10DDI_RESOURCECOPYREGION
   pfnResourceConvertRegion;
PFND3D10DDI_RESOURCEISSTAGINGBUSY
   pfnResourceIsStagingBusy;
PFND3D10DDI_RESOURCEMAP
   pfnDynamicIABufferMapNoOverwrite;
PFND3D10DDI_RESOURCEMAP
   pfnDynamicConstantBufferMapDiscard;
PFND3D10DDI_RESOURCEMAP
   pfnDynamicIABufferMapDiscard;
PFND3D10DDI_RESOURCEMAP
   pfnDynamicResourceMapDiscard;
PFND3D10DDI_RESOURCEMAP
   pfnStagingResourceMap;
PFND3D10DDI_RESOURCEMAP
   pfnResourceMap;
PFND3D10DDI_RESOURCEREADAFTERWRITE-
HAZARD
   pfnResourceReadAfterWriteHazard;
PFND3D10DDI_RESOURCERESOLVESUBRE-
SOURCE
   pfnResourceResolveSubresource;
PFND3D10DDI_RESOURCEUNMAP
   pfnDynamicIABufferUnmap;
PFND3D10DDI_RESOURCEUNMAP
   pfnDynamicConstantBufferUnmap;
PFND3D10DDI_RESOURCEUNMAP
   pfnDynamicResourceUnmap;
PFND3D10DDI_RESOURCEUNMAP
   pfnStagingResourceUnmap;
PFND3D10DDI_RESOURCEUNMAP
   pfnResourceUnmap;
PFND3D10DDI_RESOURCEUPDATESUBRE-
SOURCEUP
   pfnDefaultConstantBufferUpdateSubresourceUP;
PFND3D10DDI_RESOURCEUPDATESUBRE-
SOURCEUP
   pfnResourceUpdateSubresourceUP;
PFND3D10DDI_SETBLENDSTATE
   pfnSetBlendState;
PFND3D10DDI_SETCONSTANTBUFFERS
   pfnVsSetConstantBuffers;
PFND3D10DDI_SETCONSTANTBUFFERS
   pfnPsSetConstantBuffers;
PFND3D10DDI_SETCONSTANTBUFFERS
   pfnGsSetConstantBuffers;

PFND3D10DDI_SETCONSTANTBUFFERS
pfnHsSetConstantBuffers;
PFND3D10DDI_SETCONSTANTBUFFERS
pfnDsSetConstantBuffers;
PFND3D10DDI_SETDEPTHSTENCILSTATE
pfnSetDepthStencilState;
PFND3D10DDI_SETINPUTLAYOUT
pfnIaSetInputLayout;
PFND3D10DDI_SETPREDICATION
pfnSetPredication;
PFND3D10DDI_SETRASTERIZERSTATE
pfnSetRasterizerState;
PFND3D10DDI_SETSAMPLERS
pfnPsSetSamplers;
PFND3D10DDI_SETSAMPLERS
pfnVsSetSamplers;
PFND3D10DDI_SETSAMPLERS
pfnGsSetSamplers;
PFND3D10DDI_SETSAMPLERS
pfnHsSetSamplers;
PFND3D10DDI_SETSAMPLERS
pfnDsSetSamplers;
PFND3D10DDI_SETSCISSORRECTS
pfnSetScissorRects;
PFND3D10DDI_SETSHADER
pfnPsSetShader;
PFND3D10DDI_SETSHADER
pfnVsSetShader;
PFND3D10DDI_SETSHADER
pfnGsSetShader;
PFND3D10DDI_SETSHADER
pfnHsSetShader;
PFND3D10DDI_SETSHADER
pfnDsSetShader;
PFND3D10DDI_SETSHADERRESOURCES
pfnPsSetShaderResources;
PFND3D10DDI_SETSHADERRESOURCES
pfnVsSetShaderResources;
PFND3D10DDI_SETSHADERRESOURCES
pfnGsSetShaderResources;
PFND3D10DDI_SETSHADERRESOURCES
pfnHsSetShaderResources;
PFND3D10DDI_SETSHADERRESOURCES
pfnDsSetShaderResources;
PFND3D10DDI_SETTEXTFILTERSIZE
pfnSetTextFilterSize;
PFND3D10DDI_SETVERTEXPIPELINEOUTPUT
pfnSetVertexPipelineOutput;
PFND3D10DDI_SETVIEWPORTS
pfnSetViewports;
PFND3D10DDI_SHADERRESOURCEVIEWREADAFTERWRITEHAZARD
pfnShaderResourceViewReadAfterWriteHazard;
PFND3D10DDI_SO_SETTARGETS
pfnSoSetTargets;

Direct 3D10.1

PFND3D10_1DDI_CALCPRIVATEBLENDSTATESIZE
pfnCalcPrivateBlendStateSize;
PFND3D10_1DDI_CREATEBLENDSTATE
pfnCreateBlendState;

Direct 3D 11

PFND3D11DDI_ABANDONCOMMANDLIST
pfnAbandonCommandList;
PFND3D11DDI_CALCDEFERREDCONTEXTHANDLESIZE
pfnCalcDeferredContextHandleSize;
PFND3D11DDI_CALCPRIVATECOMMANDLISTSIZE
pfnCalcPrivateCommandListSize;
PFND3D11DDI_CALCPRIVATEDEFERREDCONTEXTSIZE
pfnCalcPrivateDeferredContextSize;
PFND3D11DDI_CALCPRIVATEDEPTHSTENCILVIEWSIZE
pfnCalcPrivateDepthStencilViewSize;
PFND3D11DDI_CALCPRIVATEGEOMETRYSHADERWITHSTREAMOUTPUP
pfnCalcPrivateGeometryShaderWithStreamOutput;
PFND3D11DDI_CALCPRIVATERESOURCESIZE
pfnCalcPrivateResourceSize;
PFND3D11DDI_CALCPRIVATESHADERRESOURCEVIEWSIZE
pfnCalcPrivateShaderResourceViewSize;
PFND3D11DDI_CALCPRIVATETESSELLATIONSHADERSIZE
pfnCalcPrivateTessellationShaderSize;
PFND3D11DDI_CALCPRIVATEUNORDEREDACCESSVIEWSIZE
pfnCalcPrivateUnorderedAccessViewSize;
PFND3D11DDI_CHECKDEFERREDCONTEXTHANDLESIZES
pfnCheckDeferredContextHandleSizes;
PFND3D11DDI_CLEARUNORDEREDACCESSVIEWFLOAT
pfnClearUnorderedAccessViewFloat;
PFND3D11DDI_CLEARUNORDEREDACCESSVIEWUINT
pfnClearUnorderedAccessViewUint;
PFND3D11DDI_COMMANDLISTEXECUTE
pfnCommandListExecute;
PFND3D11DDI_COPYSTRUCTURECOUNT
pfnCopyStructureCount;
PFND3D11DDI_CREATECOMMANDLIST
pfnCreateCommandList;
PFND3D11DDI_CREATEDEFERREDCONTEXT
pfnCreateDeferredContext;
PFND3D11DDI_CREATEDEPTHSTENCILVIEW
pfnCreateDepthStencilView;
PFND3D11DDI_CREATEDOMAINSHADER
pfnCreateDomainShader;
PFND3D11DDI_CREATEGEOMETRYSHADERWITHSTREAMOUTPUT
pfnCreateGeometryShaderWithStreamOutput;
PFND3D11DDI_CREATEHULLSHADER
pfnCreateHullShader;
PFND3D11DDI_CREATERESOURCE
pfnCreateResource;
PFND3D11DDI_CREATESHADERRESOURCEVIEW
pfnCreateShaderResourceView;
PFND3D11DDI_CREATEUNORDEREDACCESSVIEW
pfnCreateUnorderedAccessView;
PFND3D11DDI_DESTROYCOMMANDLIST
pfnDestroyCommandList;
PFND3D11DDI_DESTROYCOMMANDLIST
pfnRecycleDestroyCommandList;
PFND3D11DDI_DESTROYUNORDEREDACCESSVIEW
pfnDestroyUnorderedAccessView;

PFND3D11DDI_DISPATCH
pfnDispatch;
PFND3D11DDI_DISPATCHINDIRECT
pfnDispatchIndirect;
PFND3D11DDI_DRAWINDEXEDINSTANCEDINDIRECT
pfnDrawIndexedInstancedIndirect;
PFND3D11DDI_DRAWINSTANCEDINDIRECT
pfnDrawInstancedIndirect;
PFND3D11DDI_RECYCLECOMMANDLIST
pfnRecycleCommandList;
PFND3D11DDI_RECYCLECREATECOMMANDLIST
pfnRecycleCreateCommandList;
PFND3D11DDI_RECYCLECREATEDEFERREDCONTEXT
pfnRecycleCreateDeferredContext;
PFND3D11DDI_RELOCATEDEVICEFUNCS
pfnRelocateDeviceFuncs;
PFND3D11DDI_SETRENDERTARGETS
pfnSetRenderTargets;
PFND3D11DDI_SETRESOURCEMINLOD
pfnSetResourceMinLOD;
PFND3D11DDI_SETSHADER_WITH_IFACES
pfnPsSetShaderWithIfaces;
PFND3D11DDI_SETSHADER_WITH_IFACES
pfnVsSetShaderWithIfaces;
PFND3D11DDI_SETSHADER_WITH_IFACES
pfnGsSetShaderWithIfaces;
PFND3D11DDI_SETSHADER_WITH_IFACES
pfnHsSetShaderWithIfaces;
PFND3D11DDI_SETSHADER_WITH_IFACES
pfnDsSetShaderWithIfaces;

In other embodiments, legacy user-mode driver 122 exposes DDIs of a legacy version of another rendering framework, such as OpenGL® from Silicon Graphics, Inc, and user-mode driver 118 exposes DDIs of a newer version of the other rendering framework.

Generally, user-mode driver 118 and legacy user mode driver 112 are each configured to construct hardware contexts and command buffers. In particular, each user-mode driver converts graphic commands issued by guest software 112 (or graphics runtime 114) into hardware-specific commands for execution on physical GPU 104.

As depicted, for example, user-mode driver 118 may receive graphics commands 138, which request that GPU functions (e.g., domain, hull, or geometric shaders; Direct2D functions) be executed at physical GPU 104 on behalf of guest software 112. User-mode driver 118 is configured to convert the received graphics commands into hardware-specific commands (i.e., commands that are specific to physical GPU 104). As part of the conversion, user-mode driver 118 maintains proper hardware context for physical GPU 104. For example, user-mode driver 118 translates logical values for settings affecting a rendering pipeline into values and corresponding physical settings. User-mode driver 118 is also configured to store converted hardware-specific commands in a command buffer. Legacy user-mode driver 122 is similarly configured.

vGPU 116 also includes kernel-mode driver 126 executing in a kernel-mode of child partition 110. Kernel-mode driver 126 is configured to receive command buffers from user mode driver 118 and legacy user mode driver 122 and to construct corresponding direct memory access ("DMA") buffers. When it is time for a DMA buffer to be processed, kernel-mode driver 126 is configured to submit the DMA buffer to physical GPU 104.

As depicted, kernel mode driver 126 includes processing component 128 which is configured to process command buffers from user-mode driver 118 and legacy processing component 130 which is configured to process command buffers from legacy user-mode driver 122. For example, FIG. 1 depicts kernel mode driver 126 receiving command buffer 140 from user-mode driver 118. Kernel-mode driver is configured to process command buffers received from user-mode driver 118 using processing component 128 to generate a DMA buffer. While not depicted, kernel mode driver 126 can also communicate with graphics runtime 114 directly. As such, one or both of processing component 128 and/or legacy processing component 130 can process commands received directly from graphics runtime 114. For example, kernel mode driver 126 can receive and process commands related to geometry, hull, and/or domain shaders and Direct2D functions.

As indicated previously, root partition 108 includes render component 132, which is configured execute any requested GPU functions on physical GPU 104. As depicted, render component 132 includes renderer 134 which is configured to initiate execution of GPU functions corresponding to DDIs 120, and legacy renderer 136 which is configured to initiate execution of GPU functions corresponding to legacy DDIs 120. As such, render component 132 is configured to execute GPU functions from both a newer rendering framework and a legacy rendering framework.

In particular, render component 132 is configured to schedule any physical GPU-specific rendering commands graphics commands received from vGPU 116 for execution on physical GPU 104, and to create proper context for executing those commands. For example, render component 132 is configured to create any appropriate composition device(s) at physical GPU 104. The composition device typically represents a desktop running in connection with guest software 112.

As depicted, computer architecture 100 includes communications connections between render component 132 and user-mode driver 118, legacy user-mode driver 122 and kernel-mode driver 126. In addition, computer architecture 100 enables negotiation of communications protocol(s) among these components.

Negotiation can include determining an appropriate composition device to create at physical GPU 104 so that GPU functions requested by graphics runtime 114/guest software 112 can be accelerated at physical GPU 104. During boot time of a guest operating system within child partition 110, for example, the composition device may be determined to correspond to user-mode driver 118 of a newer rendering framework, or correspond to legacy user-mode driver 122 and a legacy rendering framework. After this initial communications protocol negotiation process, protocol negotiation may be repeated for each guest application run as part of guest software 112 to create an appropriate composition device representing each application. Composition devices can concurrently be created for applications using both newer rendering framework(s) and a legacy rendering framework. As such, computer architecture 100 supports execution of GPU functions from multiple rendering frameworks at physical GPU 104, including newer rendering frameworks represented by user-mode driver 118 and a legacy rendering framework represented legacy user-mode driver 122.

Once appropriate composition device(s) is/are determined, each of the supported DDIs are represented by one or more tokens. These tokens are communicated between each user-mode driver and corresponding components at kernel-mode driver 126 and render component 132. Thus, any GPU functions corresponding to any supported DDIs are enabled by computer architecture 100.

Figure 2:
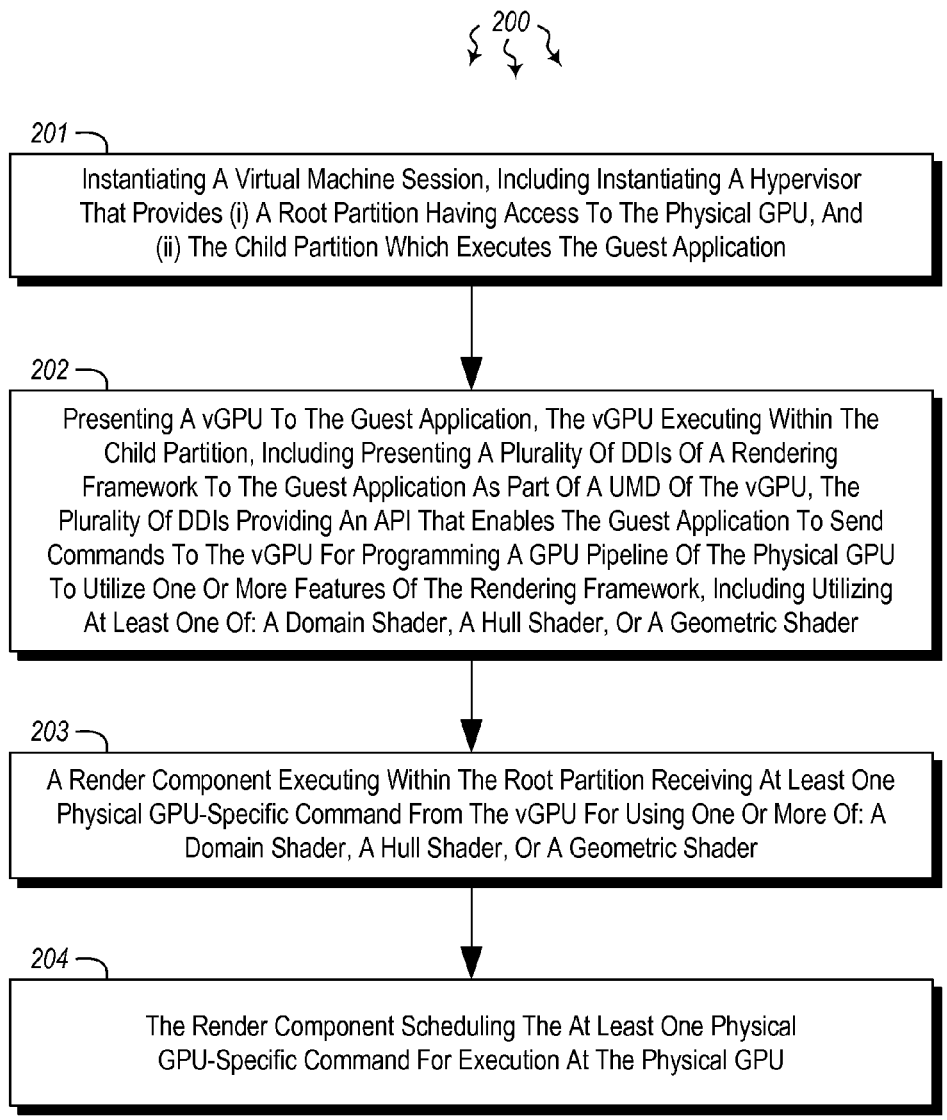
FIG. 2 illustrates a flow chart of an example method for providing a programmable GPU pipeline to a guest application executing in a child partition of a para-virtualized execution environment.

FIG. 2 illustrates a flow chart of an example method 200 for providing a programmable GPU pipeline to a guest application executing in a child partition of a para-virtualized execution environment. Method 200 will be described with respect to the components and data of computer architecture 100.

Method 200 includes an act of instantiating a virtual machine session, including instantiating a hypervisor that provides (i) a root partition having access to the physical GPU, and (ii) the child partition which executes the guest application (act 201). For example, hypervisor 106 is instantiated. Hypervisor 106 is used to provide root partition 108 and child partition 110. Child partition can execute guest software 112.

Method 200 also includes an act of presenting a vGPU to the guest application, the vGPU executing within the child partition, including presenting a plurality of DDIs of a rendering framework to the guest application as part of a UMD of the vGPU, the plurality of DDIs providing an API that enables the guest application to send commands to the vGPU for programming a GPU pipeline of the physical GPU to utilize one or more features of the rendering framework, including utilizing at least one of: a domain shader, a hull shader, or a geometric shader (act 202). For example, child partition 110 presents vGPU 116 to guest software 112/rendering framework 114. vGPU 116 virtualizes physical GPU 104. vGPU 116 includes user-mode driver 118. User-mode driver 118 exposes DDIs 120, which correspond to a rendering framework that includes one or more of domain shader, a hull shader, or a geometric shader. In some embodiments, DDIs 120 expose all DDIs of one or more rendering frameworks.

Method 200 also includes an act of a render component executing within the root partition receiving at least one physical GPU-specific command from the vGPU for using one or more of: a domain shader, a hull shader, or a geometric shader (act 204). For example, render component 132, which executes in root partition 108, can receive GPU commands and data from user-mode driver 118 and/or kernel-mode driver 126. These commands and data can include physical-GPU specific commands that were generated by user-mode driver 118 in response to receiving graphics commands 138 from graphics runtime 114. These physical-GPU specific commands can include commands related to a newer graphics runtime, such as commands related to a domain shader, a hull shader, or a geometric shader.

Method 200 also includes an act of the render component scheduling the at least one physical GPU-specific command for execution at the physical GPU (act 205). For example, renderer 134 can schedule the received physical-GPU specific commands for execution on physical GPU 104. This can involve setting up appropriate context and composition device(s) at physical GPU 104.

Accordingly, the present invention provides domain, hull, and geometry shaders in a para-virtualized environment. Thus, a guest application executing in a child partition is enabled use a rich programmable GPU pipeline of a physical GPU.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed:

1. At a computer system including one or more processors and system memory, the computer system also including a physical graphics processing unit ("GPU"), a method for providing a programmable GPU pipeline to a guest application executing in a child partition of a para-virtualized execution environment, the method comprising:

an act of instantiating a virtual machine session, including instantiating a hypervisor that provides (i) a root partition having access to the physical GPU, and (ii) the child partition which executes the guest application;

an act of presenting a virtualized graphics processing unit ("vGPU") to the guest application, the vGPU executing within the child partition, the vGPU including:

a first user-mode driver ("UMD"), executing in a user mode of the child partition, that presents a first plurality of device driver interfaces ("DDIs") of a first version of a rendering framework to the guest application, the first plurality of DDIs enabling the guest application to send commands to the vGPU for programming a GPU pipeline of the physical GPU to utilize one or more features unique to the first version of the rendering framework, including utilizing at least one of: a domain shader, a hull shader, or a geometric shader;

a second UMD, executing in the user mode of the child partition, that presents a second plurality of DDIs of a different version of the rendering framework to the guest application, the second plurality of DDIs enabling the guest application to send commands to the vGPU for programming a GPU pipeline of the physical GPU to utilize one or more features unique to the different version of the rendering framework;

a first kernel-mode driver ("KMD") processing component that corresponds to the first UMD, that executes in a kernel mode of the child partition, and that receives a first command buffer from the first UMD and constructs a corresponding first direct memory access (DMA) buffer; and a second KMD processing component that corresponds to the second UMD, that executes in the kernel mode of the child partition, and that receives a second command buffer from the second UMD and constructs a corresponding second DMA buffer;

an act of a first render component executing within the root partition receiving the first DMA buffer from the first KMD processing component, the first DMA buffer including at least one first physical GPU-specific command for using a feature unique to the first version of the rendering framework including one or more of a domain shader, a hull shader, or a geometric shader at the physical GPU;

an act of a second render component executing within the root partition receiving the second DMA buffer from the second KMD processing component, the second DMA buffer including at least one second physical GPU-specific command for using a feature unique to the different version of the rendering framework; and an act of the first render component and the second render component scheduling the at least one first physical GPU-specific command and the at least one second physical GPU-specific command for execution at the physical GPU.

2. The method as recited in claim 1, wherein the first physical GPU-specific command comprises a physical GPU-specific command for using a domain shader.

3. The method as recited in claim 1, wherein the first physical GPU-specific command comprises a physical GPU-specific command for using a hull shader.

4. The method as recited in claim 1, wherein the first physical GPU-specific command comprises a physical GPU-specific command for using a geometric shader.

5. The method as recited in claim 1, wherein each UMD converts any graphics commands received from the guest application into corresponding physical GPU-specific commands and stores corresponding physical GPU-specific commands in a command buffer.

6. The method as recited in claim 1, wherein instantiating a hypervisor that provides (i) a root partition having access to the physical GPU, and (ii) the child partition which executes the guest application comprises an act of negotiating one or more communications protocols among each UMD, each KMD processing component, and each render component, including determining a type of composition device to instantiate based on the first or different version of the rendering framework supported by the UMD.

7. The method as recited in claim 1, wherein the plurality of DDIs enable the guest application to send graphics commands to the vGPU for programming a GPU pipeline of the physical GPU to utilize all features of the rendering framework.

8. A computer program product for use at a computer system, the computer program product for implementing a method for providing GPU-accelerated computing functionality to a guest application executing in a child partition of a para-virtualized execution environment, the computer program product comprising one or more hardware storage devices having stored thereon computer-executable instructions that, when executed at a processor, cause the computer system to perform the method, including the following:

instantiate a virtual machine session, including instantiating a hypervisor that provides (i) a root partition having access to the physical GPU, and (ii) the child partition which executes the guest application;

present a virtualized graphics processing unit ("vGPU") to the guest application, the vGPU executing within the child partition, the vGPU including:

a first user-mode driver ("UMD"), executing in a user mode of the child partition, that presents a first plurality of device driver interfaces ("DDIs") of a first version of a rendering framework to the guest application, the first plurality of DDIs enabling the guest application to send commands to the vGPU for programming a GPU pipeline of the physical GPU to utilize one or more features unique to the first version of the rendering framework, including utilizing at least one of: a domain shader, a hull shader, or a geometric shader;

a second UMD, executing in the user mode of the child partition, that presents a second plurality of DDIs of a different version of the rendering framework to the guest application, the second plurality of DDIs enabling the guest application to send commands to the vGPU for programming a GPU pipeline of the physical GPU to utilize one or more features unique to the different version of the rendering framework;

a first kernel-mode driver ("KMD") processing component that corresponds to the first UMD, that executes in a kernel mode of the child partition, and that receives a first command buffer from the first UMD and constructs a corresponding first direct memory access (DMA) buffer; and a second KMD processing component that corresponds to the second UMD, that executes in the kernel mode of the child partition, and that receives a second command buffer from the second UMD and constructs a corresponding second DMA buffer;

receive, at a first render component executing within the root partition, the first DMA buffer from the first KMD processing component, the first DMA buffer including at least one first physical GPU-specific command for using a feature unique to the first version of the rendering framework including one or more of a domain shader, a hull shader, or a geometric shader at the physical GPU;

receive, at a second render component executing within the root partition, the second DMA buffer from the second KMD processing component, the second DMA buffer including at least one second physical GPU-specific command for using a feature unique to the different version of the rendering framework; and schedule the at least one first physical GPU-specific command and the at least one second physical GPU-specific command for execution at the physical GPU.

9. The computer program product as recited in claim 8, wherein the first physical GPU-specific command comprises a physical GPU-specific command for using a domain shader.

10. The computer program product as recited in claim 8, wherein the first physical GPU-specific command comprises a physical GPU-specific command for using a hull shader.

11. The computer program product as recited in claim 8, wherein the first physical GPU-specific command comprises a physical GPU-specific command for using a geometric shader.

12. The computer program product as recited in claim 8, wherein each UMD converts any graphics commands received from the guest application into corresponding physical GPU-specific commands and stores corresponding physical GPU-specific commands in a command buffer.

13. The computer program product as recited in claim 8, wherein the first plurality of DDIs enable the guest application to send commands to the vGPU for programming a GPU pipeline of the physical GPU to utilize functions of both a 2D application programming interface and a 3D application programming interface.

14. A computer system, the computer system comprising:
one or more processors;
a graphics processing unit ("GPU");
system memory; and
one or more computer-readable storage devices having stored thereon computer-executable instructions representing a virtualized graphics processing unit ("vGPU") and a render component,
wherein the vGPU executes within the child partition and includes:
a first user-mode driver ("UMD"), executing in a user mode of the child partition, that presents a first plurality of device driver interfaces ("DDIs") of a first version of a rendering framework to the guest application, the first plurality of DDIs enabling the guest application to send commands to the vGPU for programming a GPU pipeline of the physical GPU to utilize one or more features unique to the first version of the rendering framework, including utilizing at least one of: a domain shader, a hull shader, or a geometric shader;
a second UMD, executing in the user mode of the child partition, that presents a second plurality of DDIs of a different version of the rendering framework to the guest application, the second plurality of DDIs enabling the guest application to send commands to the vGPU for programming a GPU pipeline of the physical GPU to utilize one or more features unique to the different version of the rendering framework;

a first kernel-mode driver ("KMD") processing component that corresponds to the first UMD, that executes in a kernel mode of the child partition, and that receives a first command buffer from the first UMD and constructs a corresponding first direct memory access (DMA) buffer; and a second KMD processing component that corresponds to the second UMD, that executes in the kernel mode of the child partition, and that receives a second command buffer from the second UMD and constructs a corresponding second DMA buffer; and wherein the render component executes in a root partition, and includes:

a first renderer that receives the first DMA buffer from the first KMD processing component, the first DMA buffer including at least one first physical GPU-specific command for using a feature unique to the first version of the rendering framework including one or more of a domain shader, a hull shader, or a geometric shader at the physical GPU, and that schedules the at least one first physical GPU-specific command for execution at the physical GPU; and a second renderer that receives the second DMA buffer from the second KMD processing component, the second DMA buffer including at least one second physical GPU-specific command for using a feature unique to the different version of the rendering framework, and that schedules the at least one first physical GPU-specific command for execution at the physical GPU.

15. The computer system as recited in claim 14, wherein the first physical GPU-specific command comprises a physical GPU-specific command for using a domain shader.

16. The computer system as recited in claim 14, wherein the first physical GPU-specific command comprises a physical GPU-specific command for using a hull shader.

17. The computer system as recited in claim 14, wherein the first physical GPU-specific command comprises a physical GPU-specific command for using a geometric shader.

18. The computer system as recited in claim 14, wherein each UMD converts any graphics commands received from the guest application into corresponding physical GPU-specific commands and stores corresponding physical GPU-specific commands in a command buffer.

19. The computer system as recited in claim 14, further comprising negotiating one or more communications protocols among each UMD, each KMD, and each renderer, including determining a type of composition device to instantiate based a rendering framework supported by each UMD.

20. The computer system as recited in claim 14, wherein the plurality of DDIs enable the guest application to send graphics commands to the vGPU for programming a GPU pipeline of the physical GPU to utilize all features of the rendering framework.

* * * * *